(12) United States Patent
Roman et al.

(10) Patent No.: US 9,366,343 B2
(45) Date of Patent: Jun. 14, 2016

(54) SLIDING GATE REGULATOR

(71) Applicant: EMERSON PROCESS MANAGEMENT REGULATOR TECHNOLOGIES, INC., McKinney, TX (US)

(72) Inventors: Florin R. Roman, Reichenbach (DE); Silviu V. Rebreanu, Cluj-Napoca (RO); Istvan Bartha, Odorheiu-Secuiesc (RO); Vlad Cristinel Hanceanu, Cluj (RO); Aaron P. Oprean, Floresti (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 80 days.

(21) Appl. No.: 14/227,612

(22) Filed: Mar. 27, 2014

(65) Prior Publication Data

US 2015/0276068 A1  Oct. 1, 2015

(51) Int. Cl.
| | |
|---|---|
| *F16K 3/02* | (2006.01) |
| *F16K 3/32* | (2006.01) |
| *F16K 3/30* | (2006.01) |
| *G05D 16/06* | (2006.01) |

(52) U.S. Cl.
CPC ............... *F16K 3/0209* (2013.01); *F16K 3/02* (2013.01); *F16K 3/0254* (2013.01); *F16K 3/30* (2013.01); *F16K 3/32* (2013.01); *G05D 16/0666* (2013.01)

(58) Field of Classification Search
CPC ....... F16K 3/0209; F16K 3/0254; F16K 3/30; F16K 3/32
USPC ............... 251/61.1–61.5, 282–283, 326, 329; 137/625.33, 505.11
See application file for complete search history.

(56) References Cited

U.S. PATENT DOCUMENTS

| | | | | |
|---|---|---|---|---|
| 1,243,122 | A * | 10/1917 | Winters | .................... F02M 1/00 137/516.15 |
| 2,601,231 | A * | 6/1952 | Smith | .................... F16K 3/0209 137/625.33 |
| 3,183,926 | A * | 5/1965 | Boudot | ............... F16K 37/0008 137/270 |
| 3,417,784 | A * | 12/1968 | Cowan | ................ F16K 31/0679 137/625.65 |
| 3,482,777 | A * | 12/1969 | Quinn | .................... F16K 31/365 236/12.11 |
| 3,517,697 | A | 6/1970 | Hott | |
| 3,955,591 | A * | 5/1976 | Baumann | ............... F16K 3/0209 137/270 |
| 4,150,693 | A * | 4/1979 | Genevey | ........... F16L 55/02763 137/625.3 |
| 4,489,756 | A * | 12/1984 | Balz | ...................... F16K 3/0263 137/625.33 |
| 4,627,462 | A * | 12/1986 | Lyons | ................. F16K 11/0655 137/270 |

(Continued)

OTHER PUBLICATIONS

Search Report for International application No. PCT/US2015/022888, mailed Jun. 12, 2015.

(Continued)

*Primary Examiner* — Marina Tietjen
(74) *Attorney, Agent, or Firm* — Marshall, Gerstein & Borun LLP

(57) ABSTRACT

A sliding gate regulator includes a valve body having a fluid inlet and a fluid outlet connected by a flow corridor. An opening is disposed in the valve body, the opening being oriented substantially perpendicularly to the flow corridor. A stationary plate and a slidable gate are disposed within the flow corridor, the slidable gate and the stationary plate cooperating to control fluid flow through the flow corridor. A removable plug is disposed within the opening in the valve body, the removable plug providing access to the stationary plate and to the slidable gate.

16 Claims, 5 Drawing Sheets

(56) References Cited

U.S. PATENT DOCUMENTS

| | | | | |
|---|---|---|---|---|
| 4,643,226 | A | * | 2/1987 | Balz .................. F16K 27/044 137/625.33 |
| 5,020,774 | A | * | 6/1991 | Christianson ............ F16K 3/32 251/129.15 |
| 5,227,062 | A | | 7/1993 | Olsen |
| 8,037,900 | B2 | * | 10/2011 | James .................. F16K 3/0209 137/625.33 |
| 2002/0096215 | A1 | | 7/2002 | Bradley |
| 2009/0267012 | A1 | * | 10/2009 | Haberhauffe ........... F16K 3/316 251/326 |
| 2009/0320935 | A1 | | 12/2009 | Yamamoto et al. |

OTHER PUBLICATIONS

Written Opinion for International application No. PCT/US2015/022888, mailed Jun. 12, 2015.

* cited by examiner

SLIDING GATE REGULATOR

BACKGROUND

1. Field of the Disclosure

The disclosure is generally related to pressure regulators and more specifically to sliding gate pressure regulators.

2. Related Technology

Pressure regulators are used in myriad industrial and residential applications for controlling the downstream pressure of a fluid. For example, in chemical processing plants or oil refineries, pressure regulators are used to manipulate a flowing fluid to compensate for increases or decreases in demand, or other load disturbances, and thus keep the fluid pressure regulated. Similarly, pressure regulators may be used in plumbing fixtures to maintain a pre-determined pressure of fluid that automatically adjusts to variations in demand, such as anti-scald valves in showers or faucets. By controlling downstream pressure, pressure regulators compensate for variations in downstream demand. For example, as downstream demand increases, pressure regulators open to allow more fluid to flow, thus maintaining a relatively constant downstream pressure. On the other hand, as downstream demand decreases, pressure regulators close to reduce the amount of fluid flowing, again maintaining a relatively constant downstream pressure.

One type of pressure regulator is the sliding gate regulator. The sliding gate regulator includes a sliding gate and a stationary plate. Together, these two parts cooperate to regulate the flow of fluid through the regulator.

Generally speaking, the sliding gate is moved across the surface of the stationary plate by a disc pin. When throttled open, openings disposed in the slidable gate and openings disposed in the stationary plate cooperate to allow fluid to flow through the plates. Because the fluid flow path is straight through the slots (i.e., the flow path does not bend or turn), turbulence, noise, and wear are reduced. Because the slidable gate is supported from behind by the stationary plate, the slidable gate and the stationary plate are not disturbed by unbalanced forces, which are characteristic of single seated globe valves, in the closed or nearly closed position. As a result, sliding gate regulators generally achieve higher rangeability than can be achieved with a similar sized globe style valve.

A typical sliding gate regulator 10 is illustrated in FIG. 1. The sliding gate regulator 10 includes a valve body 12 having two pieces 12a, 12b attached to one another. The valve body 12 includes a fluid inlet 14 and a fluid outlet 16 connected by a flow path 18. The flow path 18 defines an opening 20 that is sized to receive the sliding gate 22 and the stationary plate 24.

An actuator 30 provides motive force to move the sliding gate 22. The actuator 30 may include an actuator housing 32 that defines an inner chamber 34. The inner chamber 34 may be divided into a pressurized chamber 36 and an unpressurized chamber 38 by a diaphragm 40. A biasing spring 42 may be disposed in the unpressurized chamber 38. The biasing spring 42 may be disposed between a diaphragm seat 44 and an adjustable spring seat 46. The adjustable spring seat 46 may be moved by an adjustment screw 48 to vary the force provided by the biasing spring 42. The diaphragm 40 may be connected to the diaphragm seat 44 by a diaphragm plate 50. The diaphragm plate 50 is attached to a valve stem 52, which is connected to the slidable gate 22 by a connector pin 53.

The biasing spring 42 moves the slidable gate 22 in response to changes in fluid pressure in the pressurized chamber 36. The valve stem 52 includes a valve pin 54 that extends through the stationary plate 24 and that is connected to the slidable gate 22 by the connector pin 53. Thus, the slidable gate 22 reciprocates within the opening 20 in response to forces provided by the biasing spring 42.

When the regulator is closed, the slidable gate 22 and the stationary plate 24 form a solid barrier to flow. The upstream pressure keeps the slidable gate 22 and the stationary plate 24 in constant contact, which eliminates noisy chattering often encountered during valve operation.

Generally, the stroke of a sliding gate regulator is about ⅓ the length of the stroke of a similarly sized globe style valve. As a result, the sliding gate regulator has a fast response, reduced droop, longer diaphragm life and greater sensitivity than similarly sized glove style valves. The slidable gate requires little travel to move from fully open to fully closed, and quickly corrects pressure or temperature deviations.

While known sliding gate regulators may have higher flow rates and less noise than similarly sized globe valves, known sliding gate valves are difficult to maintain. More specifically, the sliding gate and stationary plate are difficult to access without removing the regulator from the flow line. Additionally, the disk pin connection to the slidable gate limits the size and orientation of the openings in the slidable gate, thereby limiting the overall flow volumes that are achievable by the sliding gate regulator.

BRIEF DESCRIPTION OF THE DRAWINGS

Objects, features, and advantages of the present invention will become apparent upon reading the following description in conjunction with the drawing figures, in which.

DETAILED DESCRIPTION

Figure 1:
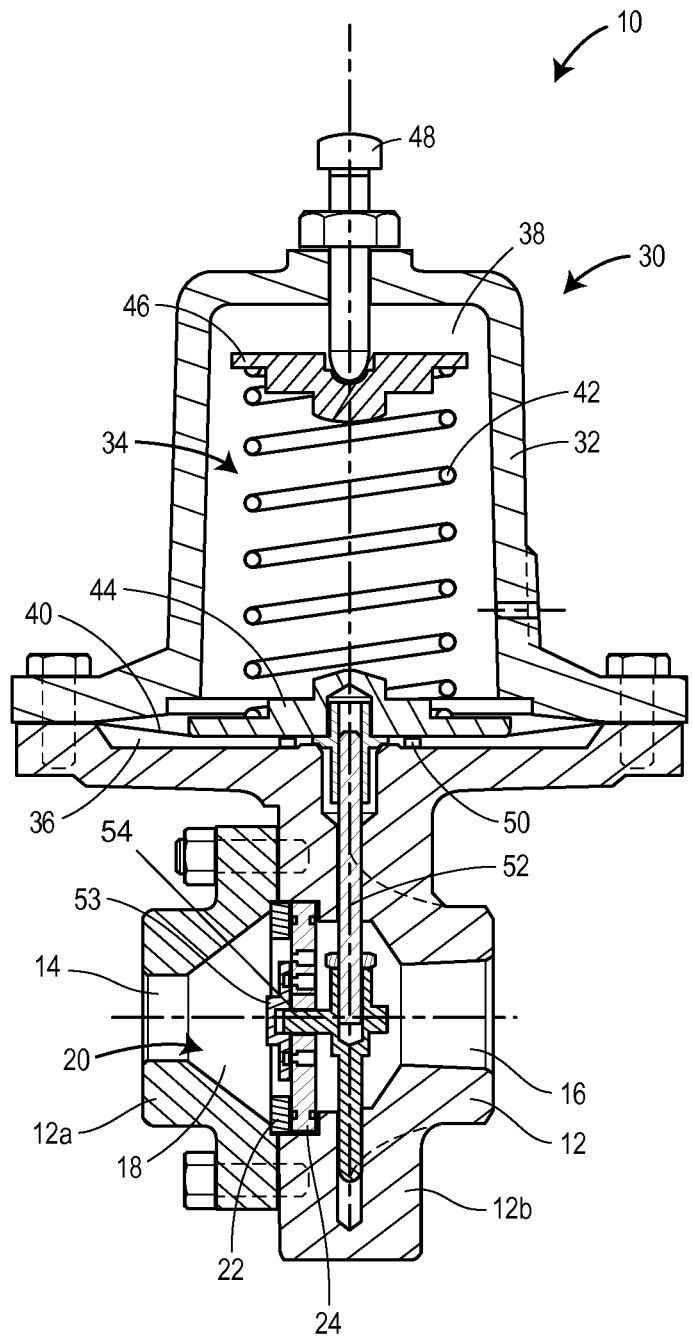
FIG. 1 is a cross-sectional view of a prior art sliding gate control valve.
Figure 2:
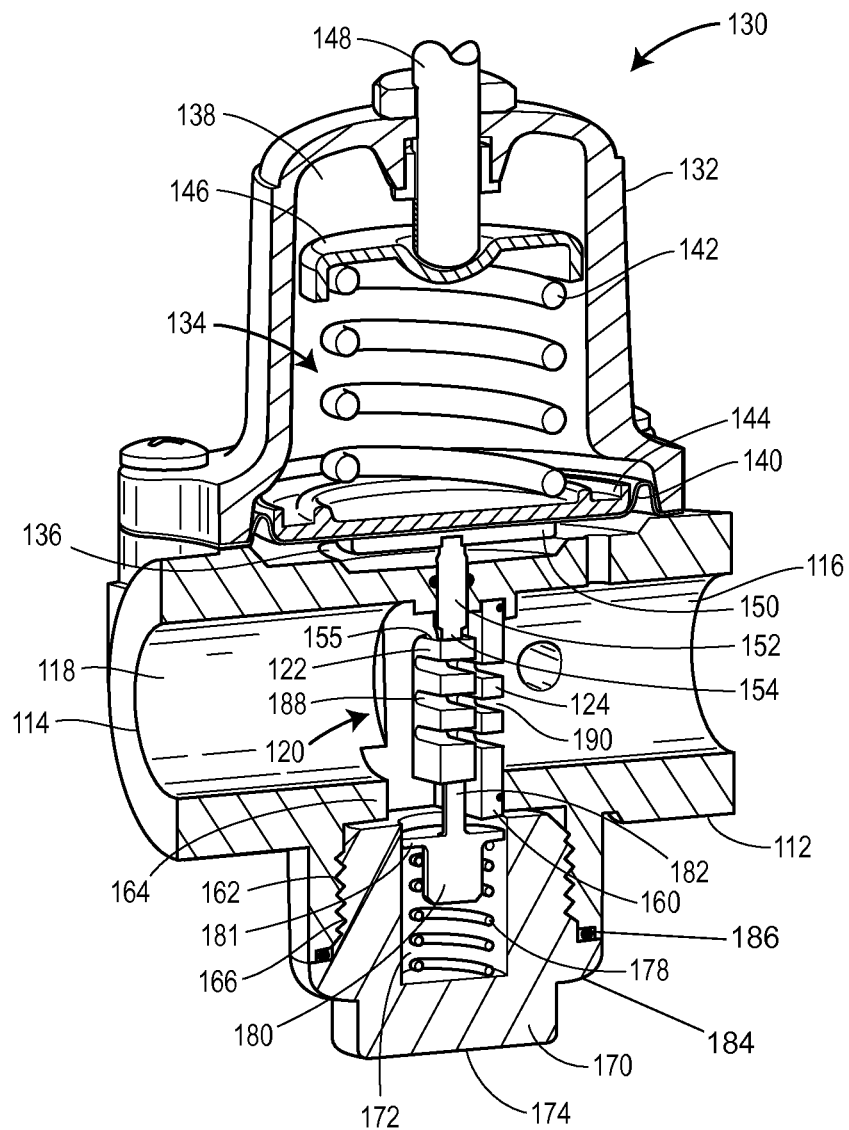
FIG. 2 is a cross-sectional perspective view of a sliding gate control valve constructed in accordance with the teachings of the disclosure.

Turning now to FIG. 2, one embodiment of a sliding gate regulator 110 that is constructed in accordance with the teachings of the disclosure is illustrated. The sliding gate regulator 110 includes a valve body 112. The valve body 112 includes a fluid inlet 114 and a fluid outlet 116 connected by a flow path 118. The flow path 118 defines an opening 120 that is sized to receive the sliding gate 122 and the stationary plate 124.

An actuator 130 provides motive force to move the sliding gate 122. The actuator 130 may include an actuator housing 132 that defines an inner chamber 134. The inner chamber 134 may be divided into a pressurized chamber 136 and an unpressurized chamber 138 by a diaphragm 140. An actuator spring 142 may be disposed in the unpressurized chamber 138. The actuator spring 142 may be disposed between a diaphragm seat 144 and an adjustable spring seat 146. The adjustable spring seat 146 may be moved by an adjustment screw 148 to vary the force provided by the biasing spring 142. The diaphragm 140 may be connected to the diaphragm seat 144 by a diaphragm plate 150. The diaphragm plate 150 is attached to a valve stem 152, which is connected to the slidable gate 122

The actuator spring 142 moves the slidable gate 122 in response to changes in fluid pressure in the pressurized chamber 136. The valve stem 152 includes a valve pin 154 that is attached to a side edge of the slidable gate 122 (e.g., an upper edge 155). The slidable gate 122 reciprocates within the opening 120 in response to forces provided by the actuator spring 142.

When the regulator 110 is closed, the slidable gate 122 and the stationary plate 124 form a solid barrier to flow. The upstream pressure keeps the slidable gate 122 and the stationary plate 124 in constant contact, which eliminates noisy chattering.

The valve body 112 includes a plug opening 160 that is oriented substantially perpendicularly to the flow path 118 and proximate the sliding gate 122 and proximate the stationary plate 124. The plug opening 160 may include a through-bore 162 having a first diameter, and a counter-bore 162 having a second diameter. In the embodiment of FIG. 2, the first diameter is smaller than the second diameter. In other embodiments, the first diameter may be larger than the second diameter, or the first and second diameters may be substantially equal in size.

The counter-bore 162 may include a threaded section 166 (e.g., internal threads) for releasably securing an access plug 170. The access plug 170 may include a plug counter-bore 172 disposed at one end and a solid plug 174 at another end. The access plug 170 may also include a plurality of threads 176 (e.g., external threads) that cooperate with the threaded section 166 to releasably secure the access plug 170 to the valve body 112.

An opposing spring 178 may be disposed within the counter bore 172. A counter plug 180 may also be at least partially disposed within the counter bore 172. The counter plug 180 may include a spring seat 181 formed by, for example, an annular flange. The counter spring 178 biases the counter plug 180 towards the flow path 118. The counter plug 180 may be operatively connected to the movable gate 122 by a counter pin 182 that extends away from the counter plug 180 and into the flow path 118. By biasing the counter plug 180, and thus the movable gate 122, towards the actuator spring 142, the counter spring 176 generally opposes movement of the actuator spring 142. In this manner, the movable gate 122 is actuated from two opposing sides, which results in a more reliable and precise movement of the movable gate 122.

The access plug 170 may include an outwardly extending flange 184 and a seal, such as an o-ring 186 disposed on a surface of the outwardly extending flange 184. The outwardly extending flange 184 and the o-ring 186 provide a seal with the valve body 112 when the access plug 170 is releasably secured within the plug opening 160.

The slidable gate 122 may include a plurality of disc openings, such as elongated disc slots 188. Similarly, the stationary plate 124 may include a plurality of plate openings, such as elongated plate slots 190. The disc slots 188 and the plate slots 190 cooperate to control fluid flow through the flow path 118. For example, when the disc slots 188 and the plate slots 190 align, at least partially, fluid is permitted to flow through the disc slots 188 and through the plate slots 190. When the disc slots 188 and the plate slots 190 do not overlap, fluid is prevented from flowing through at least one of the disc slots 188 and the plate slots 190. By actuating the movable gate 122, the flow of fluid through the flow path 118 may be controlled. By actuating the movable gate 122 from opposing sides, the center of the movable gate 122 is free for additional openings or for bigger openings, thereby improving the range of flow rates that can be achieved by the slidable gate 122 and the stationary plate 124.

Figure 3:
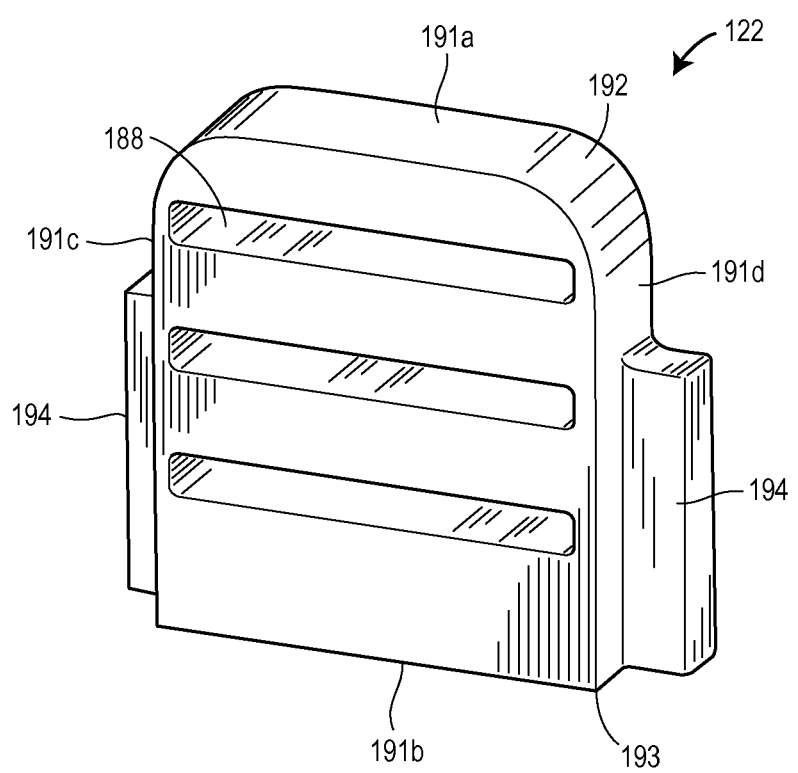
FIG. 3 is a perspective view of a sliding gate of the control valve of FIG. 2.

One example of the slidable gate 122 is illustrated in FIG. 3. The slidable gate 122 may be generally square or rectangular in shape, having an upper surface 191a, a lower surface 191b, and two side surfaces 191c, 191d. The surfaces may transition between one another with a radiused junction 192, or by a relatively sharp corner 193. One or more tabs 194 may extend outward, away from one of the side surfaces 191c, 191d. The tabs 194 guide the slidable gate 122 during reciprocation within the valve body 112, which will be explained in more detail with reference to FIG. 5. The tabs 194 may have a rear surface that is substantially flush with a rear surface of the slidable gate 122. Having tabs 194 substantially flush with a back of the slidable gate 122 assures proper control in the case of surface rectification and improves control of the process of assembly between the valve body 112, the stationary plate 124, and the slidable gate 122.

Figure 4:
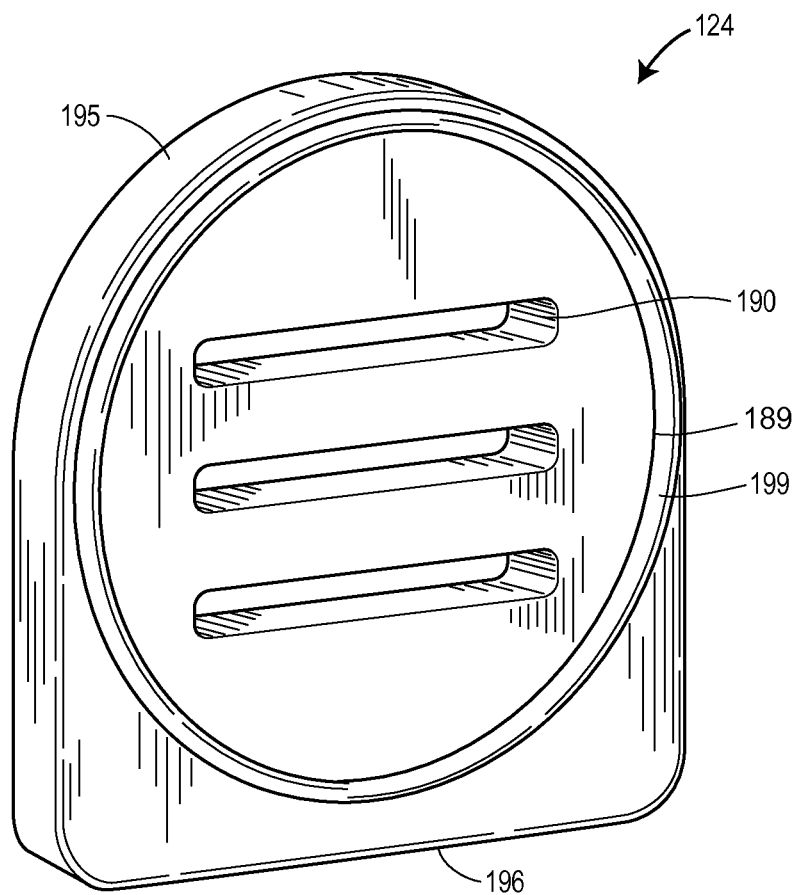
FIG. 4 is a perspective view of a fixed gate of the control valve of FIG. 2.

One example of a stationary plate 124 is illustrated in FIG. 4. The stationary plate 124 may have a rounded upper surface 195 and squared off lower surface 196. The rounded upper surface 195 may cooperate with a rounded inner surface of the valve body 112 that forms the flow path 118. A seal, such as an o-ring 189 may be disposed on a rear surface of the stationary plate 124 to form a sealing engagement with the valve body 112. In one embodiment, the o-ring 189 may be disposed in an annular channel 199.

Figure 5:
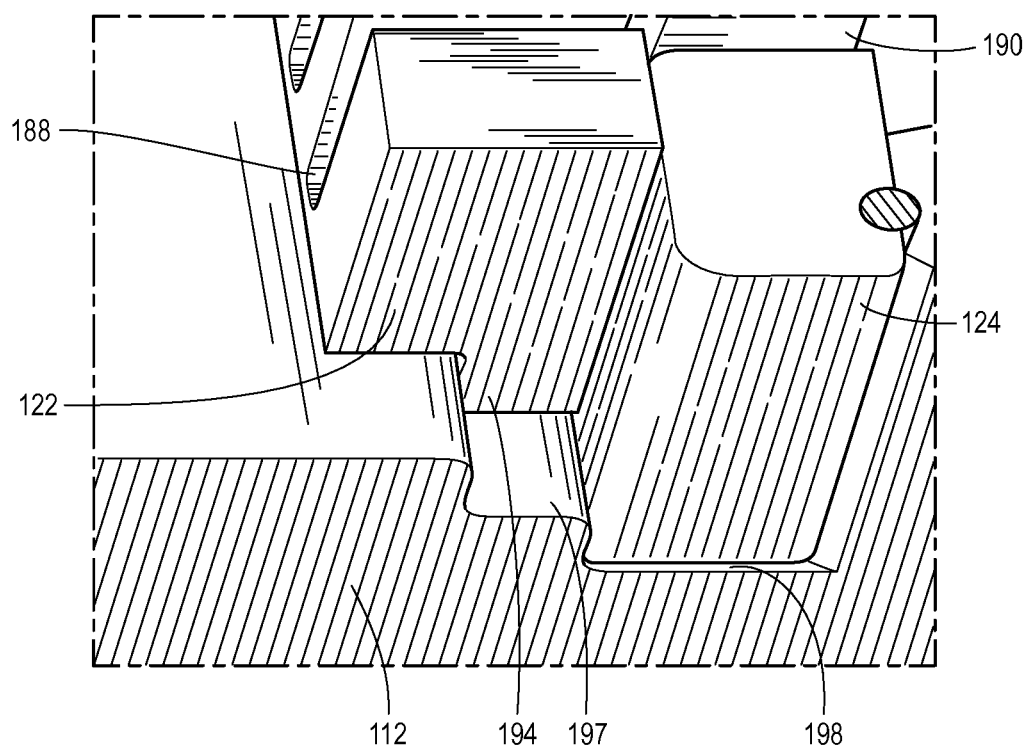
FIG. 5 is a close-up view of guiding slots for the sliding gate of FIG. 3.

As illustrated in FIG. 5, the inner surface of the valve body 112 may include a guiding channel 197 that is sized and shaped to receive a portion of the tabs 194 on the slidable gate 122. A mounting channel 198 may be formed near the guiding channel 197. The mounting channel 198 may be sized and shaped to receive a portion of the stationary plate 124. Both the guiding channel 197 and the mounting channel 198 may be open towards the plug opening 160 so that the sliding disc 122 and the stationary plate 124 may be configured to slide out of the respective channel and through the plug opening 160 when the access plug 170 is removed. In this manner, maintenance, such as cleaning or replacement of the slidable gate 122 and of the stationary plate 124 may be performed without removing or disconnecting the sliding gate regulator 110 from the flow path 118. In other words, in-line maintenance may be performed on the disclosed sliding gate regulator 110.

In some preferred embodiments, the valve body 112 and the actuator housing 132 may be formed of cast iron, carbon steel, stainless steel, or other similar materials. In other embodiments, the slidable gate 122 and the stationary plate 124 may be formed of stainless steel, stelite, monel, hastelloy, or other similar materials.

Although certain sliding gate regulators have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:
1. A sliding gate regulator comprising:
   a valve body having a fluid inlet and a fluid outlet connected by a substantially straight flow corridor;
   at least one guiding channel disposed on an inner surface of the valve body;
   an opening disposed in the valve body, the opening being oriented substantially perpendicular to the flow corridor;
   a stationary plate disposed within the flow corridor;
   a slidable gate disposed within the flow corridor, the slidable gate and the stationary plate cooperating to control fluid flow through the flow corridor, the slidable gate being capable of reciprocating motion that is substantially perpendicular to the flow corridor;

at least one tab extending outward from a side surface of the slidable gate; and a removable plug disposed within the opening in the valve body, the removable plug providing access to the stationary plate and to the slidable gate, wherein the guiding channel cooperates with the at least one tab to guide the slidable gate during reciprocation.

2. The sliding gate regulator of claim 1, wherein the removable plug includes a counter-bore, the counter-bore being oriented substantially perpendicularly to the flow corridor.

3. The sliding gate regulator of claim 2, further comprising a counter spring disposed within the counter-bore.

4. The sliding gate regulator of claim 3, further comprising a counter plug disposed at least partially within the counter-bore, the counter spring biasing the counter plug towards the flow corridor.

5. The sliding gate regulator of claim 4, further comprising a counter pin attached to the counter plug, the counter pin extending towards the flow corridor, the counter pin being operatively connected to the sliding gate.

6. The sliding gate regulator of claim 2, wherein the removable plug includes an outer flange that extends radially outward, the outer flange being disposed distal to the counter-bore.

7. The sliding gate regulator of claim 6, further comprising an o-ring disposed on the outer flange.

8. The sliding gate regulator of claim 1, wherein the removable plug is releasably secured to the valve body with a threaded connection.

9. The sliding gate regulator of claim 1, wherein the at least one tab has a rear surface that is substantially flush with a rear surface of the slidable gate.

10. The sliding gate regulator of claim 1, wherein the stationary plate includes an o-ring on a rear surface, the o-ring forming a sealing connection with an inner surface of the valve body.

11. The sliding gate regulator of claim 1, wherein each of the slidable gate and the stationary plate include a plurality of slotted openings.

12. A sliding gate regulator comprising:

a valve body having a fluid inlet and a fluid outlet connected by a substantially straight flow corridor;

at least one guiding channel disposed on an inner surface of the valve body;

a stationary plate disposed within the flow corridor; and a slidable gate disposed within the flow corridor, the slidable gate and the stationary plate cooperating to control fluid flow through the flow corridor, the slidable gate being capable of reciprocating motion that is substantially perpendicular to the flow corridor;

at least one tab extending outward from a side surface of the slidable gate, wherein the slidable gate is supported within the flow corridor by opposing biasing elements, and the guiding channel cooperates with the at least one tab to guide the slidable gate during reciprocation.

13. The sliding gate regulator of claim 12, wherein at least one of the biasing elements is a biasing spring.

14. The sliding gate regulator of claim 13, wherein both of the opposing biasing elements bias the slidable gate towards a center of the flow corridor.

15. The sliding gate regulator of claim 14, wherein a first biasing spring and a second biasing spring have different spring coefficients.

16. The sliding gate regulator of claim 14, wherein the biasing spring is connected to a pin and plug that are at least partially disposed in a counter-bore of a removable plug.

* * * * *